Feb. 23, 1932.  J. VAN ACKEREN  1,846,410
VERTICAL COKING RETORT OVEN
Filed Dec. 13, 1926   6 Sheets-Sheet 1

INVENTOR
Joseph van Ackeren.
BY
Jesse R. Langley
ATTORNEY

Feb. 23, 1932.   J. VAN ACKEREN   1,846,410
VERTICAL COKING RETORT OVEN
Filed Dec. 13, 1926   6 Sheets-Sheet 3
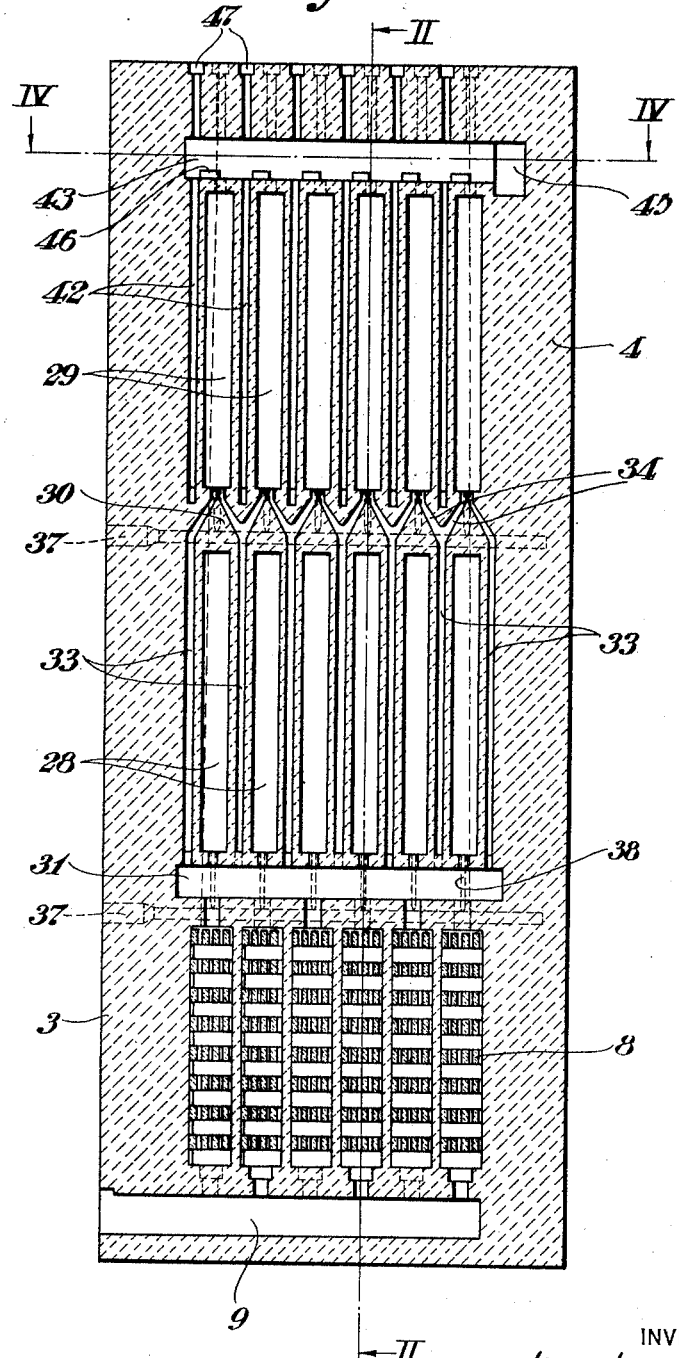
INVENTOR
Joseph van Ackeren
BY
Jesse P. Langley
ATTORNEY Feb. 23, 1932. J. VAN ACKEREN 1,846,410
VERTICAL COKING RETORT OVEN
Filed Dec. 13, 1926 6 Sheets-Sheet 4
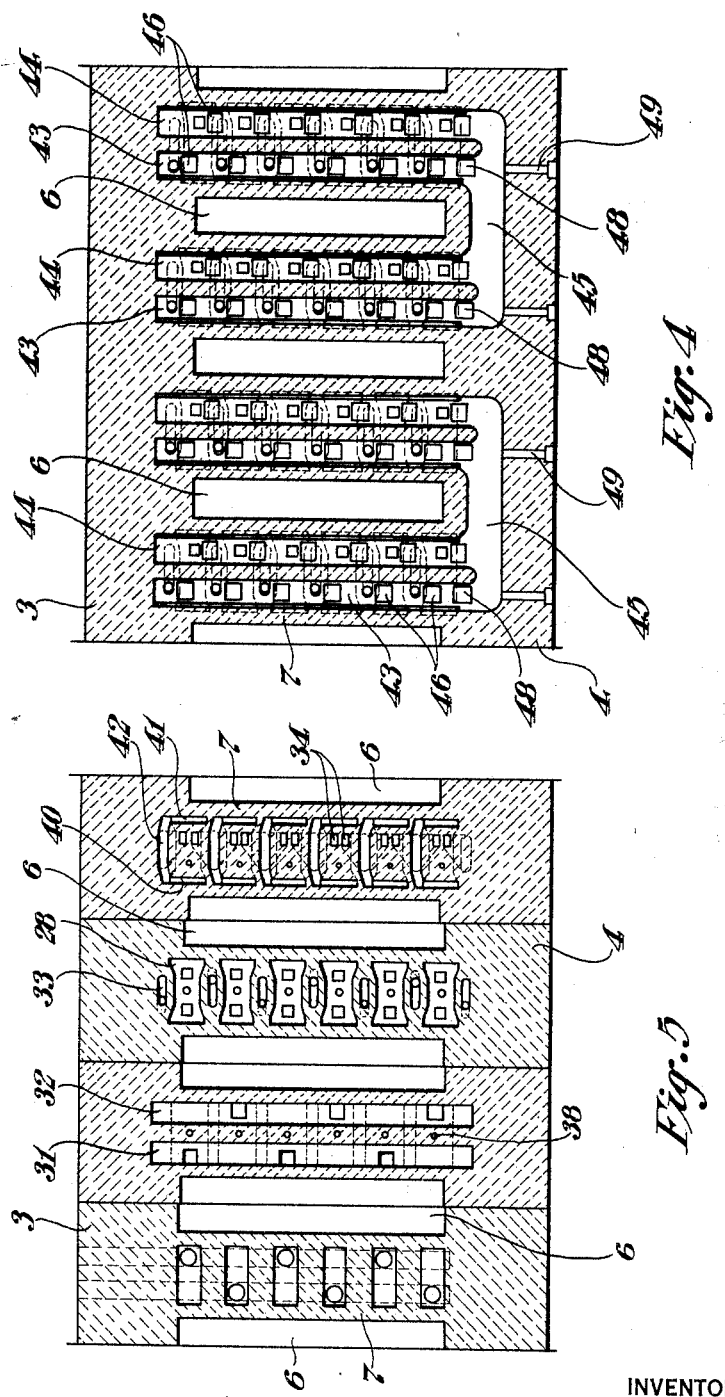
INVENTOR
Joseph van Ackeren
BY
Jesse R. Langley
ATTORNEY Feb. 23, 1932. J. VAN ACKEREN 1,846,410
VERTICAL COKING RETORT OVEN
Filed Dec. 13, 1926 6 Sheets-Sheet 5

INVENTOR
Joseph van Ackeren
BY
Jesse R. Langley
ATTORNEY

Patented Feb. 23, 1932

1,846,410

UNITED STATES PATENT OFFICE

JOSEPH VAN ACKEREN, OF PITTSBURGH, PENNSYLVANIA, ASSIGNOR TO THE KOPPERS COMPANY, A CORPORATION OF PENNSYLVANIA

VERTICAL COKING RETORT OVEN

Application filed December 13, 1926. Serial No. 154,425.

My invention relates to vertical retorts or coking retort ovens of the vertical type and more particularly to combination vertical ovens embodying heating walls having vertical heating flues therein.

One object of my invention is to provide a vertical coke oven battery of relatively small cross-sectional area that is substantially limited to that of the structure of the associated retort ovens.

A second object of my invention is to provide a vertical coke oven battery in which the heating walls are provided with vertical flues in substantially continuous sections in which fuel is burned upwardly and which are separately supplied with fuel and air and from which products of combustion are separately conveyed.

A further object of my invention is to provide a coke oven battery of the character indicated above in which there is eliminated the necessity for expansion joints between the oven structure proper and the regenerators for preheating air and fuel.

A further object of my invention is to provide a vertical retort oven battery in which the heating flues are supplied with preheated air and gas from regenerators that are closely adjacent to said flues.

A still further object of my invention is to provide a coke oven battery having vertical heating flues that are substantially equi-distant from the regenerators through which they are supplied with fuel and air whereby uniform distribution of the fuel and air may be effected substantially regardless of the length of the vertical retort ovens.

In vertical coking retort ovens, as previously constructed, it has been customary to locate the regenerators for supplying preheated air and fuel to the flues of the heating walls in horizontal extension of the latter. This arrangement is entirely satisfactory in case the retort ovens are comparatively short in length, since an equal distribution of the preheated air and fuel in the ovens that are at various distances from the regenerators may be effected by suitably adjusting the usual sliding bricks located in horizontal flues.

However, in case the ovens are of relatively great length, it will be appreciated that uniform distribution becomes more difficult with a greater variation in the distances of entrances to the flues from the regenerators. This difficulty is caused by the pressure drop along the horizontal flues.

I avoid the difficulties incident to the distribution of preheated air and fuel that are mentioned above by arranging the regenerators, one for each flame flue, beneath the heating walls and connecting them to the horizontal flues at regular intervals whereby the pressure drop in the horizontal flues is substantially negligible regardless of the lengths of the heating walls and the horizontal flues for supplying them.

In the construction of vertical coke oven batteries of the prior art, it has been necessary to provide expansion joints from the coking chambers through a side wall of the battery and from the regenerators to the coking chambers to provide for expansion when the battery is heated and thereby prevent the cumulative effect of such expansion throughout the length of the battery. The result has been to incur the possibility of leakage through the expansion joints between the coking chambers and the regenerators.

My present invention is similar in certain respects to that constituting the subject-matter of my copending application Serial No. 151,072, filed Nov. 27, 1926 (Case No. 30).

In the construction of a coke oven battery in accordance with my present invention, the regenerators are located beneath the heating walls. This construction renders it unnecessary to provide expansion joints between the coking chambers and the regenerators such as has been necessary in case the regenerators and the heating walls were arranged in side-by-side relation. Accordingly, the expense of providing such joints and the danger of leakage therethrough are eliminated.

In the present arrangement, the vertical flues of the heating walls are in substantially continuous sections, but they are separately supplied with fuel and air and products of combustion are separately conveyed therefrom. Lean gas or rich gas and preheated air may be alternatively supplied to each of the flue sections. The flue sections are closely adjacent at their inner ends and are, therefore, substantially continuous from the standpoints of heating and structure. By reason of their connections, they are, therefore, separate from an operating control standpoint.

Preheated air and fuel are supplied to the bottom portions of each of the flue sections and separate means are provided for conveying products of combustion from the top portion of each of the sections. This arrangement provides that the flow of burning gases is upward during inflow and the waste gases flow downwardly through an associated heating wall during outflow of the latter.

My invention will be best understood by reference to the exemplification shown in the accompanying drawings, in which similar reference numerals are employed to designate corresponding parts.

Fig. 3 is a sectional view, taken at right angles to that of Fig. 2, on the line III—III of Fig. 2;

Fig. 4 is a horizontal sectional view taken on the line IV—IV of Fig. 3;

Fig. 5 is a similar view, taken along the line V—V of Fig. 2;

Figure 1:
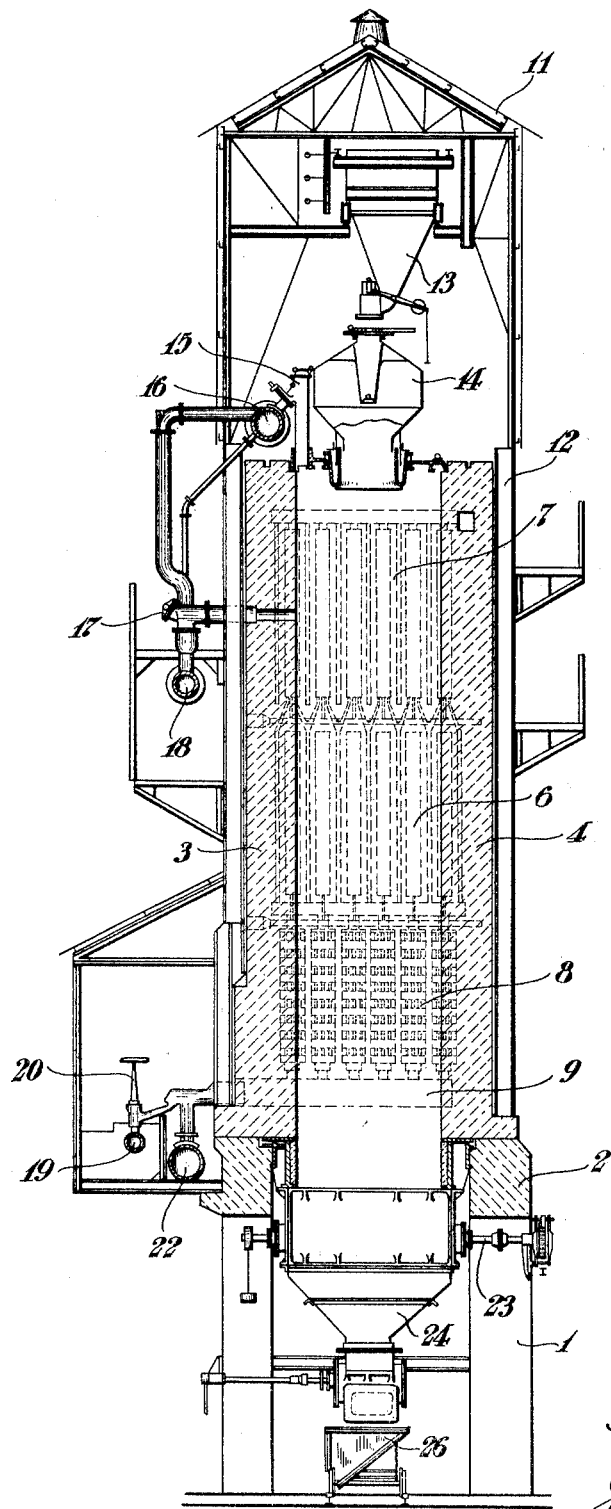
Figure 1 is a view, in transverse vertical section, of a vertical coke oven battery constructed in accordance with my invention.

Referring particularly to Fig. 1, a battery of vertical coking retort ovens of the continuous type comprises a framework 1, a foundation 2 and an oven structure comprising outer walls 3 and 4. Extending between the walls 3 and 4 are a number of vertical coking retorts 6, through one of which the sectional view is taken. Associated with the retorts 6 are heating walls 7, one of which appears in this view. Regenerators 8, having sole channels 9 are located between the walls 3 and 4 and beneath the heating walls 7.

A super-structure 11 that is supported by framework 12 provides a support for a charging car 13 for supplying a coal magazine 14 that is located above the tops of the several retorts. A primary gas offtake 15 is located at the top of each retort of the battery and is connected to a primary collecting main 16. A secondary gas offtake 17, that is located below the top of each of the retorts for the purpose of discharging gas that is evolved at a lower level, is connected to a secondary collecting main 18. Producer gas, or other lean gas, is supplied through the sole channels 9 from a gas main 19 that is provided with regulating valves 20. A main 22 conducts waste gases to the stack. Beneath the battery is located a power-driven coke extractor 23 for each of the retorts. Below the coke extractor is a coke magazine 24 that is provided with a water-sealed door (not shown) which controls the discharge of coke into a coke-receiving car 26.

Reference may now be had to Figs. 2, 3, 4 and 5, in which the structural details of the coke oven battery are illustrated. The coke oven battery may comprise any suitable or convenient number of retorts 6, which alternate with their associated heating walls 7. In the battery embodying my invention, there may be five of such retorts, by way of example, with their attendant six heating walls, but only certain of the retorts and heating walls are shown, inasmuch as the structural details thereof are substantially identical.

Each of the retorts 6 comprises a relatively narrow vertical passage of elongated cross-section, tapering slightly between adjacent heating walls 7, the greater width being at the bottom in order to facilitate the flow of coal and coke downwardly therethrough.

Each heating wall 7 is provided with vertical heating flues divided into lower sections 28 and upper sections 29 that are in vertical alinement and are sufficiently closely adjacent that each of the so alined lower and upper sections together constitute a substantially continuous heating flue. The number of heating flues may be in accordance with the length of the wall, six being shown by way of example in the structure illustrated herein. As best shown in Fig. 5, each of the heating flues is substantially rectangular in cross-section, the ends being slightly wider than the intermediate portion of the flue. The closely adjacent ends of the upper and the lower sections are formed by an intermediate or horizontal brickwork 30, the structural details of which will be later described.

The flue system of each of the heating walls 7 is operatively connected by means of horizontal flues 31 and 32 to six regenerators 8 of the usual checkerwork type that are located beneath the corresponding heating wall and in alinement with the corresponding vertical flame flues. When producer gas is employed as a fuel, one of the horizontal flues conveys preheated gas and the other conveys preheated air to both the lower and the upper sections of the several heating flues of each wall in which gas is being burned. As will be noted in Figs. 3 and 4, each of the horizontal flues 31 and 32 is substantially directly connected through suitable ports to each of the lower sections 28. The horizontal flues 31 and 32 are connected to the upper sections 29 by means of ducts 33 that extend between and closely parallel the lower sections 28.

Alternate ducts 33 are connected to the horizontal flue 31 and the other ducts 33 are connected to the horizontal flue 32. As is shown in Fig. 3, each of the ducts 33, except the end ones, have two branches 34 that are connected respectively to two of the upper sections 29, the branches 34 being located in the horizontal brickwork 30. By means of this arrangement, each of the upper sections may be supplied with fuel and preheated air by the employment of a minimum number of ducts 33.

In case oven gas or rich gas is employed as a fuel, it is supplied without preheating to each series of flue sections by means of a gas gun (not shown) and a horizontal distributing duct 37 of usual construction that is connected to the lower portion of each of the flue sections. The horizontal duct for supplying the upper flue sections extends through the horizontal brickwork 30. The horizontal duct 37 for supplying the lower flue sections is located beneath the horizontal flues 31 and 32 and is connected to vertical ducts 38 extending between the horizontal flues 31 and 32.

The products of combustion from the lower flue sections are withdrawn from the top of each section through two rectangular ducts 40 and 41 that are closely adjacent to the sides of the heating wall. The ducts 40 and 41 turn in opposite directions through an angle of 90° as they extend upwardly and around in a vertical duct 42, which extends between and closely parallels the upper flue sections 29 and is connected to an upper horizontal flue 43.

The products of combustion from the upper flue sections 29 are withdrawn substantially directly through ducts in the top thereof into a second upper horizontal flue 44 that is parallel to the upper horizontal flue 43. The upper horizontal flues 43 and 44, which extend substantially the entire length of the heating walls 7, extend into a portion of the wall 4, where they merge into a cross-around flue 45, which, as its name indicates, passes around the ends of a retort 6 and is connected to similar upper horizontal flues 43 and 44 of an adjacent heating wall 7.

Figure 2:
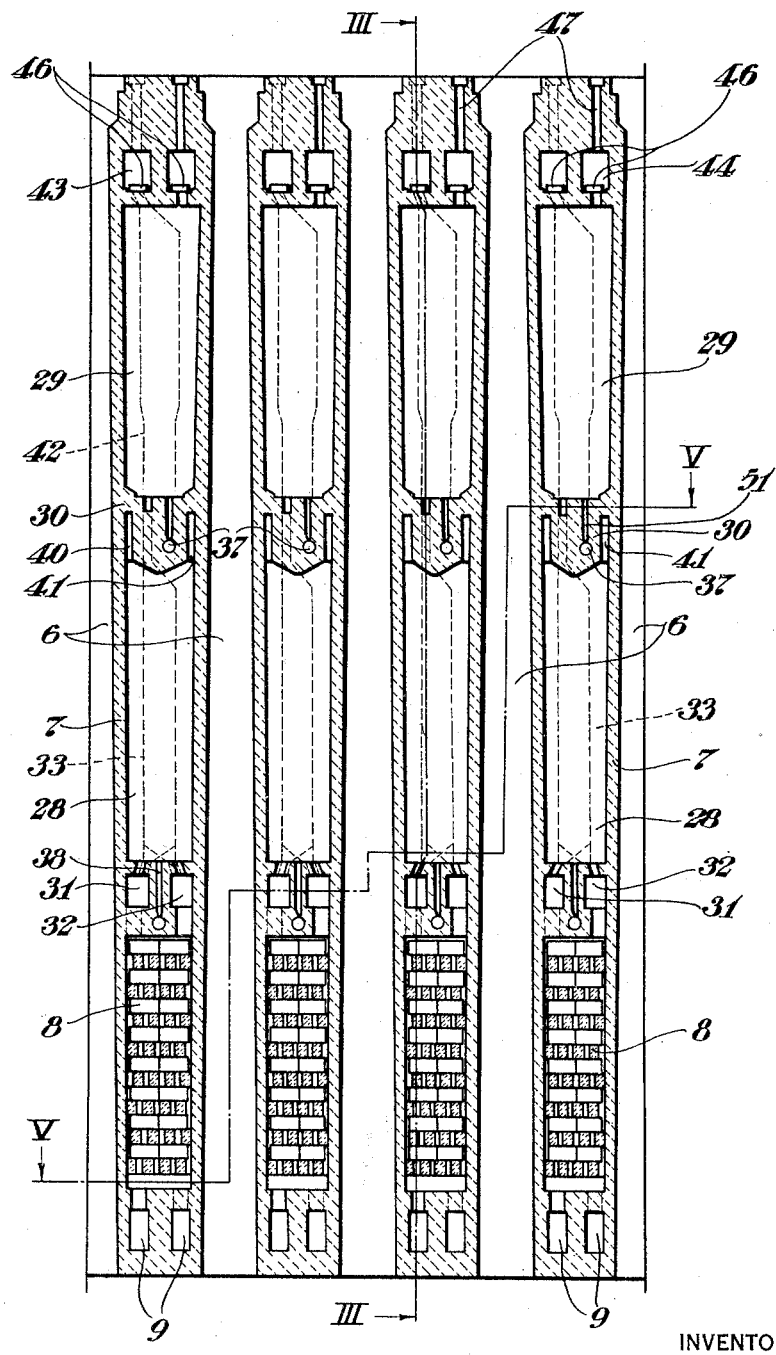
Fig. 2 is a sectional view of a portion of a coke oven battery taken along the line II—II of Fig. 3.

As best shown in Figs. 2, 3 and 4, each of the openings leading from the upper horizontal flues 43 and 44 to the upper sections 29 and to the ducts 42 is controlled by a sliding brick 46. The positions of the sliding bricks 46 may be adjusted through openings 47 through the top of the corresponding wall 7. Also, as shown in Fig. 4, each of the upper horizontal flues 43 is provided with a sliding brick 48 for regulating the relative quantities of products of combustion flowing therethrough, openings 49 in the wall 4 providing access for this purpose.

Figure 6:
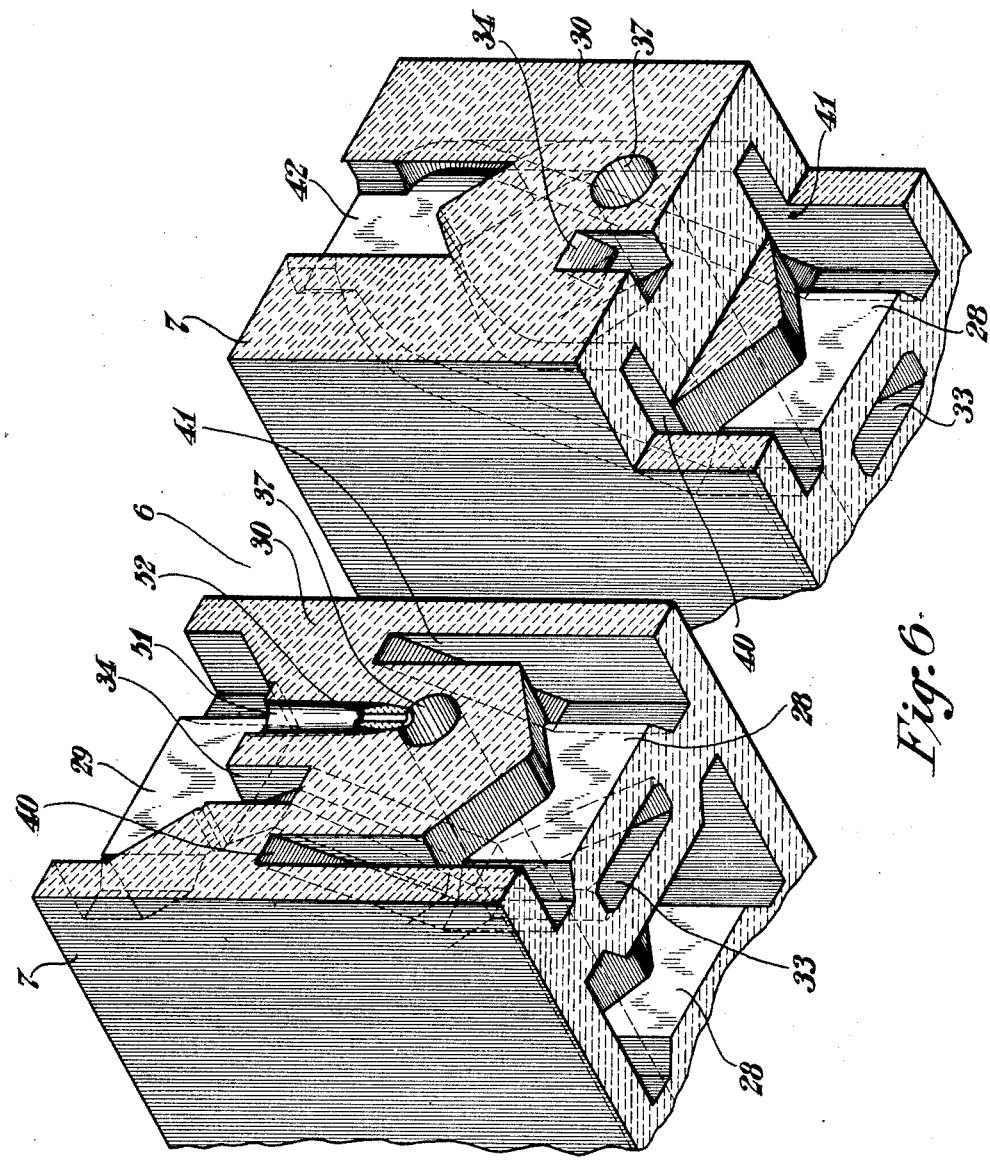
Fig. 6 is a sectional view in perspective of central portions of the intermediate brickwork of adjacent heating walls at the substantially confluent ends of the upper and lower flue sections.

Reference may now be had to Fig. 6, in which is illustrated in enlarged detail the relations of the various flue sections and ducts in the intermediate junction brickwork 30. The view illustrates a portion of each of two adjacent heating walls 7 that are spaced to provide a retort 6 therebetween.

It will be noted that the lower flue sections 28 are relatively closely adjacent, their intermediate portions being indented to provide space between them for the ducts 33 for supplying air and producer gas to the upper flue sections 29. Each flue section 28 is provided with the ducts 40 and 41 that are in substantial continuation of the outer sides of the flue sections that extend upwardly and longitudinally of the wall and, as previously stated, turn through an angle of 90° in opposite directions to merge into the vertical duct 42 for conveying products of combustion from the primary combustion sections 28.

It will be noted that the top portion of each of the flue sections 28 is inclined toward the ducts 40 and 41 and that the bottom of the duct 42 is similarly inclined upwardly from the ducts 40 and 41 in order to provide a substantially continuous surface and thereby facilitate the flow of gases through the several channels.

It will be observed that the upper ends of the ducts 33 are inclined toward one side thereof and are connected to branch ducts 34, which extend in each direction to supply air or producer gas to the adjacent upper flue sections 29. The arrangement of flue sections and ducts described above provides a continuous horizontal section through the intermediate brickwork 30 that is traversed by a horizontal duct 37, which is connected by a duct 51 to each of the upper flue sections 29. Each of the ducts 51 is provided with a nozzle 52, the details of which constitute no part of the present invention.

The vertically alined lower and upper flue sections 28 and 29 have their inner ends closely adjacent and, in addition, the ducts 40 and 41 extend close to the side walls of the heating wall and thereby substantially bridge the relatively small gap between the lower and upper flue sections, with the result that only a comparatively negligible portion of the surface of the heating wall is not directly heated from the interior by the flue sections or the ducts 40 and 41. Furthermore, the flame flue sections are continuously and closely paralleled by their intermediate ducts 33 conveying highly preheated air or air and gas and by the ducts 42 conveying hot products of combustion whereby such interwoven ducts and flame flue sections constitute a unified heating wall formed of substantially continuous vertical heating flues.

Figure 7:
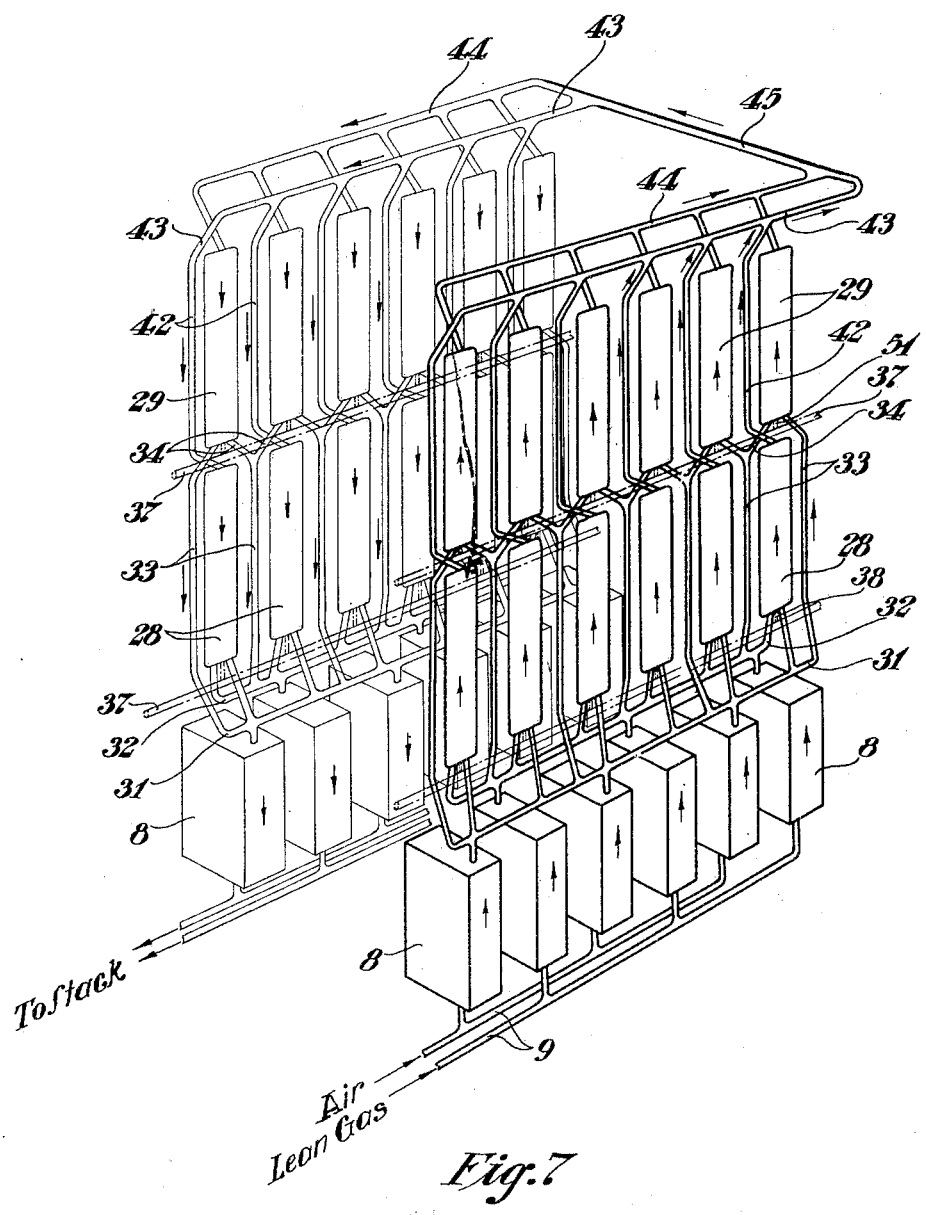
Fig. 7 is a conventional flow diagram for the vertical flues of two adjacent heating walls and for the means for supplying gas and air thereto and for conveying products of combustion therefrom.

The heating systems of one pair of operatively associated heating walls 7 are shown diagrammatically in the conventional flow diagram of Fig. 7. It will be understood that, in the interests of clearness, the relative positions of certain of the parts are somewhat inaccurately illustrated.

In the operation of the heating systems for a pair of adjacent heating walls, it may be assumed, for example, that the connections are arranged for burning of gas or upflow in the flue sections of the nearer wall, as viewed in Fig. 7. It may be assumed, also, that, as indicated by arrows, the gases of combustion from the above-mentioned wall flow downwardly through the ducts and flues of the associated wall. The courses of the fuel and air and the resultant products will now be traced through the entire heating system of the associated walls.

Air and producer gas are respectively admitted at the bottoms of alternate regenerators of the nearer heating wall and are preheated as they proceed upwardly through the open brickwork or checkerwork, the regenerators having been previously heated by waste gases flowing in the reverse direction. The preheated air enters the lower horizontal flue 31 and the preheated producer gas enters the lower horizontal flue 32, from which they are distributed to the lower flue sections 28, where the primary combustion occurs. Air and producer gas are also conveyed by alternate vertical ducts 33 to the upper flue sections 29, where the secondary combustion occurs.

The products of combustion from the lower flue sections 28 pass upwardly through vertical ducts 42, into the upper horizontal flue 43, while the products of combustion from the upper flue sections 29 pass through openings in the tops thereof to the upper horizontal flue 44. The waste gases flow in the direction of the respective arrows into the cross-around flue 45, where the waste gases from the respective series of flue sections are commingled and their flow and temperatures are equalized to constitute a uniformly flowing mixture of substantially uniform temperature. The highly heated waste gases then pass into the upper horizontal flues 43 and 44 of the associated heating wall and are distributed by the ducts 42 and the connections to the upper flue sections 29 into the respective flue sections from which they are conveyed by the vertical ducts 33 and the connections of the lower flue sections to the lower horizontal flues 31 and 32.

The waste gases are conveyed by the lower horizontal flues 31 and 32 in substantially equal quantities to the several regenerators 8 of the second wall and they pass downwardly therethrough to store heat therein. The waste gases, after leaving the regenerators, pass through the sole channels 9 and are conveyed by any suitable means to the stack. At the end of a suitable period, the connections are reversed and air and gas are supplied to the farther wall and combustion occurs in its several flue sections and the products of combustion traveling in directions opposite the arrows are supplied to the flue sections of the nearer wall, from which they pass downwardly through the corresponding regenerators and through the stack in the manner previously described.

When coke oven gas or rich gas is employed as a fuel, it is supplied substantially directly without preheating to the respective series of flue sections of one wall by the horizontal ducts 37. In this case, all of the regenerator chambers 8 of the wall in which combustion occurs are traversed by air which is accordingly supplied both by the usual air ducts and by the ducts employed for conveying producer gas when the latter is the fuel gas. The flow system is otherwise identical with that just described in connection with the employment of producer gas.

It will be appreciated that a greater quantity of gas may be required in the secondary combustion sections than in the primary combustion sections for the reason that the coal is comparatively cold when it is supplied to the upper portion of the battery while it has been brought to a comparatively high temperature before it reaches the portion of the walls heated by the lower flue sections 28. However, the vertical ducts 42, which convey highly heated gases of combustion from the lower flue sections, traverse the upper portion of the wall and contribute materially to the heating thereof and tend somewhat to equalize the fuel requirements for the respective lower and upper sections.

While a greater quantity of fuel may be consumed in the upper sections of the flues and a greater quantity of heat units are supplied to the upper portion of the heating wall, the lower portion of the retort is preferably maintained at a higher temperature than the upper portion in order that water gas may be made at the lower portion by the injection of suitable quantities of water. The yield of gas is thus considerably increased without materially affecting the quantity or the quality of the coke.

While the total amount of gas supplied to the wall may be controlled by the gas-regulating valves outside the battery, the distribution within the series of flue sections of the wall may be initially effected by the sliding bricks 46. However, in view of the number of such openings, this method is somewhat inconvenient.

I have found that the relative amounts of gas supplied to the upper and the lower flue sections respectively may be regulated by a single sliding brick 48 in the upper horizontal flue 43, which conveys the waste gases of the primary combustion sections. The variation of the cross-sectional area of this flue will determine the relative amounts of air and gas that are supplied to the lower and the upper flue sections, respectively. When the directions of flow of fuel and gases are reversed, a corresponding sliding brick 48 in the upper horizontal flue 43 of the associated wall is employed as the regulating means.

The operation of the heating systems has been described for one pair of heating walls. In a battery of five retorts, six heating walls are employed and they are connected in three pairs, each of which is similar to, and operates in the same manner as, the pair described above.

It may be assumed that the battery is in operation and that the heating systems of the several pairs of walls are operating in the manner described above to heat the several walls of the battery. It may be assumed further that coal is being supplied to the open top portions of the several retorts 6 from the coal magazine 14. The coal, which is permitted to move downwardly at a desired rate through the tapered retorts 6, gives up the greater portion of its volatile matter in the initial portion of its path. The evolved gases and smoke are collected at the top of the battery by the ascension pipe or gas offtake 15, from which they are conveyed to the collecting main 16 and thence to the usual by-product house for suitable treatment. Additional gases that are evolved at a lower depth in the retorts are collected by the secondary gas offtake 17, with which each retort is provided and conveyed into the secondary collecting main 18.

When the coal reaches the lower portion of the retort, it is in the form of coke. After suitable quenching, coke is removed from the base of the column by the coke extractor 23, which operates at such rate as to insure that the coal is completely coked during the period of its passage through the retort. The coke, after passing through the extractor, falls into the coke magazine 24, from which it is discharged at desired intervals into the coke-receiving car 26, by means of which it is conveyed to any suitable place for shipment or storage.

A coke oven constructed in accordance with my invention possesses the advantages that it occupies relatively small ground space, although the height of the battery is increased by placing the regenerators underneath the heating walls. The expense of providing expansion joints between the regenerators and the coking chambers, as in the construction wherein the regenerators are in extension of the heating walls, is eliminated in the present construction, since the regenerators are located beneath the oven structure proper.

The location of the regenerators beneath the heating wall and closely adjacent to the corresponding heating flues that are supplied by them insures that the heating flues are substantially equi-distant from the regenerators and that there is substantially no difference in pressure drop between the regenerators and the respective heating flues. This feature renders the number of heating flues and the length of the heating walls substantially immaterial in so far as it may concern the equal distribution of preheated gas and air.

The separate withdrawal of products of combustion from the respective series of flue sections has rendered the regulation of relative quantities of gas and air thereto a comparatively simple matter, since it is only necessary to adjust the position of a single sliding brick to regulate the distribution for a pair of heating walls.

The system of connections for the flues and regenerators insures that the inflow regenerators are always separated from the outflow regenerators by the coking chamber and its charge and the flame flues of one wall are similarly separated from the outflow flues of the associated wall. There is, therefore, no possibility of leakage of fuel gas into the waste gases which are under suction by reason of the separation.

The foregoing and other advantages will be apparent to those skilled in the art relating to coking retort ovens of the vertical type. It is conceivable that modifications of the construction and methods of operation may be suggested and that my invention may be variously otherwise embodied. It is intended, therefore, that my invention shall not be limited except as expressed in the appended claims.

I claim as my invention:

1. In a coking retort oven, the combination with a coking chamber, a heating wall therefor having vertical heating flues in superposed groups and regenerators beneath said wall for preheating fuel gas and air separately and simultaneously, of means for communicably connecting said regenerators to the lower portion of each of said flues for supplying air and fuel gas thereto.

2. In a coking retort oven, the combination with a coking chamber, a heating wall therefor having vertical heating flues in superposed rows and regenerators beneath said wall for preheating fuel gas and air separately and simultaneously, of means for communicably connecting said regenerators to the lower portion of each of said flues for supplying air and fuel gas thereto, and means for withdrawing products of combustion from the upper portion of each of said flues.

3. In a vertical coking retort oven, the combination with a coking chamber, a heating wall therefor having a plurality of substantially continuous superposed vertical flame flues, and regenerators beneath said wall and connected to said flues, of means for separately supplying said flues with fuel and withdrawing products of combustion therefrom.

4. In a vertical coking retort oven, the combination with a heating wall having a plurality of groups of superposed vertical heating flues in substantially continuous alinement, and regenerators beneath said wall and connected to said heating flues, of means for separately supplying said flues with fuel and withdrawing products of combustion therefrom, said means comprising lower horizontal flues for carrying fuel and air and upper horizontal flues for carrying products of combustion.

5. In a vertical coking retort oven, the combination with a heating wall having a plurality of superposed rows of vertical heating flues in substantially continuous alinement, and regenerators beneath said wall, of means for separately supplying said heating flues with fuel and withdrawing products of combustion therefrom, said means comprising lower horizontal flues for carrying fuel and air from said regenerators for distribution to the several heating flues and upper horizontal flues for collecting products of combustion from said heating flues and conveying said products to said regenerators.

6. In a vertical coking retort oven, the combination with a heating wall having a plurality of vertical heating flues in substantially continuous pairs, said flues being arranged in a plurality of series and regenerators beneath said wall and connected to said flues, of means for separately supplying said flues with fuel and withdrawing products of combustion therefrom, said means comprising lower horizontal flues respectively connected to each series of heating flues and an upper horizontal flue for each series of heating flues for conveying products of combustion therefrom.

7. The combination with a heating wall having superposed rows of vertical heating flues therein comprising substantially continuous upper and lower flues, of a regenerator beneath each of said lower flues, and means comprising horizontal flues for communicably connecting each of said regenerators to each of said heating flues at a lower portion thereof.

8. The combination with a heating wall having vertical heating flues therein comprising substantially continuous upper and lower flues, of regenerators beneath said flues, lower horizontal flues connected to said regenerators and to the lower portion of each of said flues and two upper horizontal flues connected to the upper and the lower flues respectively at an upper portion thereof.

9. The combination with a heating wall having vertical heating flues therein comprising substantially continuous upper and lower flues, of regenerators beneath said flues for preheating fuel gas and air separately and simultaneously, lower horizontal flues connected to said regenerators and to the lower portion of each of said heating flues to supply preheated fuel gas and air to said flue sections for up-burning therein, and two upper horizontal flues connected to the upper and the lower heating flues respectively at an upper portion thereof, for conveying products of combustion therefrom, one of said flues being provided with means for regulating the flow therein.

10. The combination with a heating wall having a plurality of vertical heating flues in pairs substantially continuous upper and lower flues, of means for separately supplying fuel to the lower portion of each of said heating flues for up-burning therein, separate means for conveying products of combustion from the upper and the lower flues and means for regulating the flow in one of said conveying means.

11. The combination with a heating wall having a plurality of vertical heating flues in substantially continuous pairs, of means for supplying preheated air and either preheated lean gas or rich gas to the lower portion of each of said flues and means for withdrawing products of combustion from the upper portion of each of said flues.

12. In a coke oven structure, two adjacent heating walls, each of said walls having vertical heating flues in pairs of substantially continuous upper and lower flues, regenerators beneath each pair of said heating flues and connected to the lower portion of each of said heating flues by means of lower horizontal flues, upper horizontal flues connected to the upper and the lower heating flues respectively at the upper portions thereof, means in one of said upper horizontal flues for regulating flow therein, and a flue for connecting all of the upper horizontal flues of both walls.

13. In a coke oven structure, a heating wall comprising an upper and a lower vertical heating flue that are in vertical alinement and horizontal brickwork associated with the adjacent ends of said flues, said lower flue having a curved passage extending from the upper portion thereof through said brickwork and a vertical passage adjacent said upper flue and connected to said curved passage.

14. In a coke oven structure, a heating wall comprising a system of vertical flues arranged in an upper and a lower group, vertical passages alternating respectively with the flues of the upper and the lower groups, horizontal brickwork associated with the adjacent ends of the upper and the lower flues, said brickwork containing two curved ducts for connecting each of said lower flues to an upper vertical passage for conveying products of combustion and said brickwork containing also two ducts for connecting each of the lower vertical passages to two upper flues respectively for conveying fuel and air thereto.

15. In a coking retort oven, a coking chamber, heating walls therefor having heating flues therein, and regenerators beneath said walls, said flues and said regenerators being so connected that the lower part of the coking chamber is between regenerators adapted to serve simultaneously as inflow and outflow regenerators, respectively.

16. In a coking retort oven, a coking chamber, heating walls therefor having flame flues therein, and regenerators beneath said walls, said flues and said regenerators being so connected that the coking chamber is between regenerators adapted to serve simultaneously as inflow and outflow regenerators, respectively, and also between the flame flues of regenerators adapted to serve two adjacent heating walls.

17. In a coking retort oven comprising a coking chamber the combination with a heating wall for heating said coking chamber having superposed vertical flame flues that are so closely adjacent as to be substantially continuous and regenerators beneath said heating wall for preheating air and fuel gas separately and simultaneously, of means for communicably connecting said regenerators to the lower portion of each of said flues for supplying air and fuel thereto.

18. In a coking retort oven comprising a coking chamber the combination with a heating wall for heating said coking chamber having superposed vertical flame flues that are so closely adjacent as to be substantially continuous and regenerators beneath said flues, lower horizontal flues communicably connected to said regenerators and to the lower portion of each of said flues and two upper horizontal flues communicably connected to the upper and the lower flues respectively at the upper portions thereof.

19. In a coking retort oven comprising a coking chamber the combination with a heating wall for heating said coking chamber having superposed vertical flame flues that are so closely adjacent as to be substantially continuous, of means for separately supplying fuel to the lower portion of each of said flues for up-burning therein, separate means for conveying products of combustion from the upper and the lower flues and means for regulating the flow in one of said conveying means.

20. In a coking retort oven comprising a coking chamber the combination with two heating walls for heating said coking chamber each of said walls having superposed vertical flame flues that are so closely adjacent as to be substantially continuous, regenerators beneath said flues and communicably connected to the lower portion of each of said flues by means of lower horizontal flues, upper horizontal flues communicably connected to the upper and the lower flues respectively at the upper portions thereof, means in one of said upper horizontal flues for regulating flow therein, and a flue for communicably connecting all of the upper horizontal flues of both walls.

In testimony whereof, I have hereunto subscribed my name this 11th day of December, 1926.

JOSEPH van ACKEREN.